United States Patent [19]

Jost et al.

[11] Patent Number: 4,696,850

[45] Date of Patent: Sep. 29, 1987

[54] IRON-ON INTERLINING COMPOSITE OF KNIT LAYER AND NONWOVEN LAYER OF SIMILAR STRUCTURE

[75] Inventors: Manfred Jost, Hemsbach; Jurgen Knoke, Weinheim, both of Fed. Rep. of Germany; Zenji Yoshida, Shiga, Japan; Noburo Ohta; Terumo Nakanishi, both of Sashima, Japan

[73] Assignee: Firma Carl Freudenberg, Weinheim, Fed. Rep. of Germany

[21] Appl. No.: 921,228

[22] Filed: Oct. 20, 1986

[30] Foreign Application Priority Data

Mar. 25, 1986 [DE] Fed. Rep. of Germany ....... 3610029

[51] Int. Cl.$^4$ ................................................ B32B 3/00
[52] U.S. Cl. ..................................... 428/197; 156/305; 427/389.9; 428/198; 428/212; 428/219; 428/236; 428/253; 428/287; 428/288
[58] Field of Search ............... 428/197, 198, 236, 253, 428/287, 288, 212, 219

[56] References Cited

U.S. PATENT DOCUMENTS 4,122,227 10/1978 Dean .................................. 428/197
4,450,196  5/1984 Kamat ................................ 428/197

*Primary Examiner*—Marion C. McCamish
*Attorney, Agent, or Firm*—Kenyon & Kenyon

[57] ABSTRACT

An iron-on interlining composite of nonwoven and knit material is described, the knit being similar to the nonwoven material as to fiber structure and the knit fibers being tightly welded to the nonwoven fibers.

16 Claims, No Drawings

IRON-ON INTERLINING COMPOSITE OF KNIT LAYER AND NONWOVEN LAYER OF SIMILAR STRUCTURE

FIELD OF THE INVENTION

This invention relates to interlinings for stiffening fabrics and more particularly, nonwoven/knit composite interlinings.

BACKGROUND OF THE INVENTION

For the large area processing of fixable interlining materials the advantages of nonwoven fabrics over woven and knit fabrics are well known. Such advantages include good bulk at light weights, easy cutting and punching and soft, full-bodied hand. In many cases, softness, combined with a certain form or shape stability, is desired for easier working. As noted above, nonwoven fabrics are soft; however, they generally do not have the desired form stability. When nonwoven fabrics are modified to provide more form stability the desired softness may be lost and a relatively hard hand developes. In contrast, knit fabrics generally have good form stability but lack the softness of nonwovens.

Nonwoven/knit composite materials are generally known for applications where the combined softness of the former with the form stability of the latter is of importance. For use as iron-on interlinings, however, such composites have heretofore proven unsuitable, because after dry cleaning undesirable unevenness or distortion of the lined fabrics surface occurs probably due to differences in the dimensional changes of the nonwoven and knit plies of the composite.

SUMMARY AND OBJECTS OF THE INVENTION

It is the object of this invention to provide an interlining of a nonwoven/knit composite which has, combined with a soft, full-bodied hand as customary for nonwoven materials; additionally, the high form stability and elasticity of a knit fabric.

Another object of this invention is to provide a nonwoven-knit composite that does not distort due to substantial differences in dimensional changes between nonwoven and knit plies that occur during conventional washing and dry cleaning.

The present invention provides a composite interlining comprising a first ply of nonwoven fabric having a weight of about 10 to 70 g/m$^2$; and a second ply of knit fabric fiber bonded to the first ply, wherein the knit fabric has a nonwoven-type fiber structure, a weight of about 10 to 40 g/m$^2$, a yarn titer of about 12 to 30 dtex at a mesh count of about 6 to 12 wales/cm and about 8 to 12 rows/cm.

The invention also provides a composite interlining comprising a first ply of nonwoven fabric with predominantly synthetic fibers and a knit fabric, preferably warp-knit, having a weight of about 10 to 40 g/m$^2$. The titer of the knit fabric is 12 to 30 dtex at a mesh count between 6 to 12 wales/cm and 8 to 26 rows/cm.

The composite underlinigs of this invention may be coated spotwise with a conventional fusion adhesive to provide the desired iron-on properties.

It is essential that the knit ply has a similar fiber structure to the nonwoven ply, so that during fiber bonding a firm anchoring or adherence between the plies takes place. This configuration prevents the distortions, i.e, appearance of unevenness and blisters, which occur with prior art composite interlinings due to differences in dimensional change between the nonwoven and knit plies during dry cleaning or washing.

It has been found, surprisingly, that in the composites of this invention despite a partial loss of the character of the co-welded knit ply, the co-welded soft nonwoven ply gains greatly in form stability while the typical softness of the nonwoven material is preserved.

DETAILED DESCRIPTION OF THE INVENTION

As compared with a knit interlining alone, the composite according to this invention shows, surprisingly, a tensile strength in both directions reduced to almost one third, which, however, is greater than that of the nonwoven material alone. This lower tensile strength has clear advantages in application technology. For example, unless the dimensional change of an interlined outer fabric and of a conventional interlining knit is exactly the same—which it rarely is—there is danger that distortions such as blistering will occur as a result from dry cleaning. Due to the lesser strength of the nonwoven material in the interlining composite of this invention—the nonwoven material develops no shrink force and no blistering occurs regardless of the degree of difference in the dimensional changes of the two materials. Further, as compared with an interlining of nonwoven fabric alone of comparable softness, the composite material has greater form stability, this being advantageous in garment making. The interlining of the invention is used, therefore, mainly for classic suits in men's clothing and for outer garments (tailored suits) for women.

The nonwoven fabric employed in the invention has a soft consistency and is composed of, e.g., Nylon 66 or, preferably, Nylon 6 as the primary fiber which may be blended with up to 50% of other synthetic fibers or native and/or regenerated cellulose fibers. The nonwoven fabric has a weight of 10 to 70 g/m$^2$, preferably, 20 to 50 g/m$^2$. Higher fabric weights reduce the softness and elegant hand of the nonwoven composite. In addition to polyamide fibers, e.g., nylons, polyester fibers or polyester/copolyester mixtures can also be employed as the primary fiber in the nonwoven fabric.

The methods for production of the nonwoven fabrics used in this invention are well known and form no part of the invention. Longitudinal, transverse, or irregular nonwoven materials may also be employed. When a longitudinal nonwoven fabric which has very low strength in the transverse direction used the knit contributes stabilization mainly in the transverse direction, and such interlinings are particularly useful for reinforcing large areas.

The knit fabric may be a warp-knit of monofil or multi-filament yarns. The weave may be tricot, plain, sateen, velvet or combinations of these weaves. An important feature of the knit fabrics is that their fibers are structured so that in the fiber bonding process they are welded to the nonwoven fibers; that is the knit fabric must be adapted as set forth herein in its fiber structure to be similar to the fiber structure of the nonwoven fabric.

As with the nonwoven fabrics Nylon 6 knits are advantageous. Other preferred knit fabrics may be polyesters, and polyester/copolyester mixtures.

The two plies, i.e., nonwoven and knit, are preferably adhered by spot-welding them together and the knit fabric may be attached to the side of a nonwoven fabric coated with a fusion adhesive. To arrange the knit on the outer side of a nonwoven fabric away from the adhesive compound is possible, though less desirable, because in this configuration the full, soft hand of the nonwoven material is no longer so dominant. It is also possible in an alternative embodiment to fix the knit fabric between two nonwoven fabrics or gauzes.

The fixing or adhering of the nonwoven and knit plies can be effected by any type of fiber bonding, as for example a full-area bonding in a thermofusion oven with or without calendering. A soft hand is achieved by spotwise welding and calendering one smooth and one patterned roll.

Coating with a thermofusion adhesive is ordinarily done in a spotwise pattern, and preferred adhesives are copolyamides, particularly a ter-polyamide of Nylon 66-Nylon 6-Nylon 12, copolyesters, low-pressure polyethylene and PVC plastisols. The adhesive is preferably applied in amounts between about 8 and 40 g/m$^2$.

The invention will now be explained in greater with reference to Examples given below.

EXAMPLE 1

Warp-knit Application

On a conventional carding machine a sliver is carded with a fiber blend of 100% by weight Nylon 6 1.7/40.

The resulting gauze having a weight of 25 g/m$^2$ is deposited by means of a cross-layer on a lath belt. Before the bonding with a calender, there is placed on the top side of the gauze a warp-knit consisting of 100% by weight Nylon 6 and having a yarn titer of 17 dtex, a mesh count of 9 wales/cm and 10 rows/cm, and a weight of 14 g/m$^2$.

The laminate is then fixed with an embossing calender at 200° C., one steel roll of which is smooth while the other is engraved, with 64 dots per square centimeter at a dot spacing of 1.25 mm, the dot dimensions being 0.4×0.4×0.61 mm.

On the side fixed with the smooth calender roll, on which the warp-knit is applied, there is the applied spotwise 16 g/m$^2$ of a fusion adhesive composition of a ter-polyamide Nylon 66 -Nylon 6 - Nylon 12 having a melting point of about 120° C.

The interlining nonwoven/knit composite produced in this manner has a soft, pleasant hand with good elasticity and is very stable in washing and dry cleaning showing no distortions due to different dimensional changes of nonwoven and knit fabrics.

EXAMPLE 2

Warp-knit Intermediate Ply

On a longitudinal carding machine a gauze is carded with fibers 100% by weight Nylon 6. This gauze, having a weight of 8 to 10 g/m$^2$, is deposited on a lath belt. A warp-knit fabric is placed on the gauze. This warp-knit fabric consists of 100% by weight Nylon 6 having a weight of 14 g/m$^2$ and yarn titer of 17 dtex at a mesh count of 9 wales/cm and 10 rows/cm.

By means of two additional longitudinal carding machines there are placed on the warp knit two additional gauzes, consisting of 100% by weight Nylon 6 and having a weight of 15 g/m$^2$.

The unbonded nonwoven composite, in which the warp knit lies between the gauzes, is then bonded with an embossing calender at 200° C. one of the steel rolls being smooth and the other engraved. The engraving consists of 64 dots per cm$^2$ at a dot spacing of 1.25 mm and dot dimensions of 0.5×0.4×0.61 mm and the draw-off speed is 30 m/min.

Onto the side fixed with the smooth calender roll there are applied spotwise 16 g/m$^2$ of a fusion adhesive composition of a ter-polyamide Nylon 66 - Nylon 6 - Nylon 12 having a melting point of about 120° C.

The tensil strengths of the various fabrics, in N/5 cm, measured with a tensile testing machine are:
Warp knit alone—lengthwise 55,—crosswise 63
Nonwoven alone—lengthwise 16,—crosswise 2
Composite per Example 2—lengthwise 25,—crosswise 18
Fabric interlining—lengthwise 196,—crosswise 174
Double rib interlining—lengthwise 66.4,—crosswise 60.5

The interlining composite material produced in this manner also shows a nonwoven-like, soft, pleasant hand with good elasticity and is distortion free after washing and dry cleaning.

What is claimed:

1. A composite interlining comprising:
   a first ply of nonwoven fabric having a weight of about 10 to 70 g/m$^2$; and
   a second ply of knit fabric adhered to the first layer, and wherein the knit fabric has a nonwoven fiber structure, a weight of about 10 to 40 g/m$^2$, a yarn titer of about 12 to 30 dtex at a mesh count of about 60 to 12 wales/cm and about 8 to 26 rows/cm.

2. The composite interlining according to claim 1, wherein the nonwoven fabric comprises more than about 50% Nylon 6 fibers and the knit fabric is entirely Nylon 6 fibers.

3. The composite interlining according to claim 2, wherein the nonwoven fabric and knit fabric are adhered by spot-welds.

4. The composite interlining according to claim 3 wherein the nonwoven fabric has a weight of 20 to 50 g/m$^2$.

5. The composite interlining according to claim 1 wherein the nonwoven fabric comprises more than about 50% polyester fibers and the knit fabric is entirely polyester fibers.

6. The composite interlining according to claim 5, wherein the nonwoven fabric and knit fabric are adhered by spot-welds.

7. The composite interlining according to claim 6 wherein the nonwoven fabric has a weight of 20 to 50 g/m$^2$.

8. The composite interlining according to claim 1 wherein the first layer is adhered to the second layer by fiber bonding.

9. The composite interling according to claim 1 wherein a side of the nonwoven fabric is coated with a thermofusion adhesive in a spotwise pattern and the knit fabric is welded to the thermofusion adhesive side of the nonwoven fabric.

10. The composite interlining according to claim 1 wherein a third ply of nonwoven fabric is adhered to the composite so that the knit fabric is disposed between two nonwoven plies.

11. A composite interlining comprising: a Nylon 6 nonwoven fabric having a weight of about 25 g/m$^2$; and a Nylon 6 warp-knit fabric having a weight of about 14 g/m$^2$ and yarn titer of 17 dtex at a mesh count of 9 wales/cm and 10 rows/cm, fiber bonded in a predetermined pattern to a surface of said nonwoven fabric.

12. The interlining of claim 11 wherein the predetermined pattern is 64 dots/cm² at a dot spacing of 1.25 mm and dot dimension of 0.4 by 0.4 by 0.61 mm.

13. The interlining of claim 12, wherein:
a thermofusion adhesive is spotwise coated on the warp-knit fabric.

14. The interlining of claim 13, wherein the thermofusion adhesive is a ter-polyamide of Nylon 66 - Nylon 6 - Nylon 12 having a melting point of about 120° C.

15. A composite interlining comprising:
a Nylon 6 nonwoven fabric ply having a weight of about 8 to 10 g/m²; a Nylon 6 warp-knit fabric ply having a first and second major surface, a weight of about 14 g/m² and yarn titer of about 17 dtex at a mesh count of about 9 wales/cm and about 10 rows/cm, said nonwoven fabric fiber bonded to said first major surface of said warp-knit fabric; and
two plys of Nylon 6 gauze having a weight of about 15 g/m² fiber bonded to said second major surface of said warp-knit fabric.

16. A method for making an iron-on composite interlining, comprising the steps of:
fiber bonding a first ply of nonwoven fabric having a weight of about 10 to 70 g/m² to a second ply of knit fabric having a weight of about 10 to 40 g/m² and a yarn titer of about 12 to 30 dtex at a mesh count of about 6 to 12 wales/cm and about 8 to 26 rows/cm forming a nonwoven/knit composite; and,
applying a thermofusion adhesive to said composite.

* * * * *